United States Patent
Christie et al.

(10) Patent No.: US 10,542,768 B1
(45) Date of Patent: Jan. 28, 2020

(54) METHOD AND APPARATUS FOR DRYING FOOD ITEM

(71) Applicant: Tyson Foods, Inc., Springdale, AR (US)

(72) Inventors: Mark A. Christie, Fayetteville, AR (US); Theodore Burnett, Fayetteville, AR (US)

(73) Assignee: TYSON FOODS, INC., Springdale, AR (US)

( * ) Notice: Subject to any disclaimer, the term of this patent is extended or adjusted under 35 U.S.C. 154(b) by 182 days.

(21) Appl. No.: 15/355,997

(22) Filed: Nov. 18, 2016

Related U.S. Application Data

(60) Provisional application No. 62/256,921, filed on Nov. 18, 2015.

(51) Int. Cl.
| | |
|---|---|
| A23L 13/00 | (2016.01) |
| A47J 37/06 | (2006.01) |
| B65D 81/20 | (2006.01) |
| F24C 15/32 | (2006.01) |
| A23L 13/70 | (2016.01) |

(52) U.S. Cl.
CPC .......... *A23L 13/76* (2016.08); *A47J 37/0641* (2013.01); *B65D 81/2007* (2013.01); *F24C 15/325* (2013.01)

(58) Field of Classification Search
CPC .. B65D 81/20; B65D 81/2007; A47J 37/0641; F24C 15/325
USPC .......................................... 99/472, 474, 476
See application file for complete search history.

(56) References Cited

U.S. PATENT DOCUMENTS

| | | | |
|---|---|---|---|
| 2,419,877 | A | 4/1947 | Birdseye |
| 4,033,048 | A | 7/1977 | Van Ike |
| 4,045,639 | A | 8/1977 | Meisel et al. |
| 4,664,924 | A | 5/1987 | Sugisawa et al. |
| 4,856,203 | A | 8/1989 | Wennerstrum |
| 5,019,412 | A | 5/1991 | Hattori |
| 5,666,868 | A | 9/1997 | Diete et al. |
| 5,672,370 | A | 9/1997 | Durance et al. |
| 5,676,989 | A | 10/1997 | Durance et al. |
| 5,942,265 | A | 8/1999 | Roberds et al. |
| 5,962,057 | A | 10/1999 | Durance et al. |
| 5,972,397 | A | 10/1999 | Durance et al. |

(Continued)

FOREIGN PATENT DOCUMENTS

| | | |
|---|---|---|
| CA | 2354300 C | 7/2010 |
| CN | 202511587 U | 10/2012 |
| WO | 2008092228 A1 | 8/2008 |

*Primary Examiner* — Reginald Alexander
(74) *Attorney, Agent, or Firm* — Greensfelder, Hemker & Gale, P.C.

(57) ABSTRACT

A method and apparatus is provided for curing a food item utilizing a vacuum environmental profile and a temperature environmental profile using convection heating. An apparatus including a closed environmental control system having an internal sealable curing chamber is provided. A vacuum pump can be communicably connected to the internal sealable curing chamber and can be used to create a vacuum in the internal sealable curing chamber. The vacuum pump and internal sealable chamber can maintain the vacuum for a time sufficient to achieve a predetermined moisture content for a selected food item. The technology as disclosed can include a closed heat transfer system directing heated fluid into the internal sealable curing chamber by convection.

8 Claims, 10 Drawing Sheets

(56) References Cited

U.S. PATENT DOCUMENTS

| | | | |
|---|---|---|---|
| 6,128,831 | A | 10/2000 | Durance et al. |
| 6,297,479 | B1 | 10/2001 | Wefers |
| 6,312,745 | B1 | 11/2001 | Durance et al. |
| 6,442,866 | B2 | 9/2002 | Wefers |
| 8,718,113 | B2 | 5/2014 | Durance et al. |
| 8,722,749 | B2 | 5/2014 | Durance et al. |
| 8,877,469 | B2 | 11/2014 | Durance et al. |
| 9,316,437 | B2 | 4/2016 | Fu et al. |
| 2002/0006464 | A1 | 1/2002 | Wefers |
| 2002/0071899 | A1 | 6/2002 | Rainbolt et al. |
| 2004/0129147 | A1* | 7/2004 | Blumel .............. A21B 1/26 99/357 |
| 2005/0183586 | A1* | 8/2005 | Blumel .............. A21B 1/46 99/476 |
| 2008/0302253 | A1* | 12/2008 | Salvaro .............. F24C 15/00 99/325 |
| 2010/0000110 | A1 | 1/2010 | Li |
| 2010/0218395 | A1 | 9/2010 | Durance et al. |
| 2011/0280993 | A1 | 11/2011 | Lagares Corominas |
| 2012/0030963 | A1 | 2/2012 | Durance et al. |
| 2012/0291305 | A1 | 11/2012 | Fu et al. |
| 2014/0328867 | A1 | 11/2014 | Fu et al. |
| 2015/0113640 | A1 | 4/2015 | Krten et al. |
| 2016/0137997 | A1 | 5/2016 | Durance et al. |
| 2016/0209114 | A1 | 7/2016 | Fu et al. |

* cited by examiner

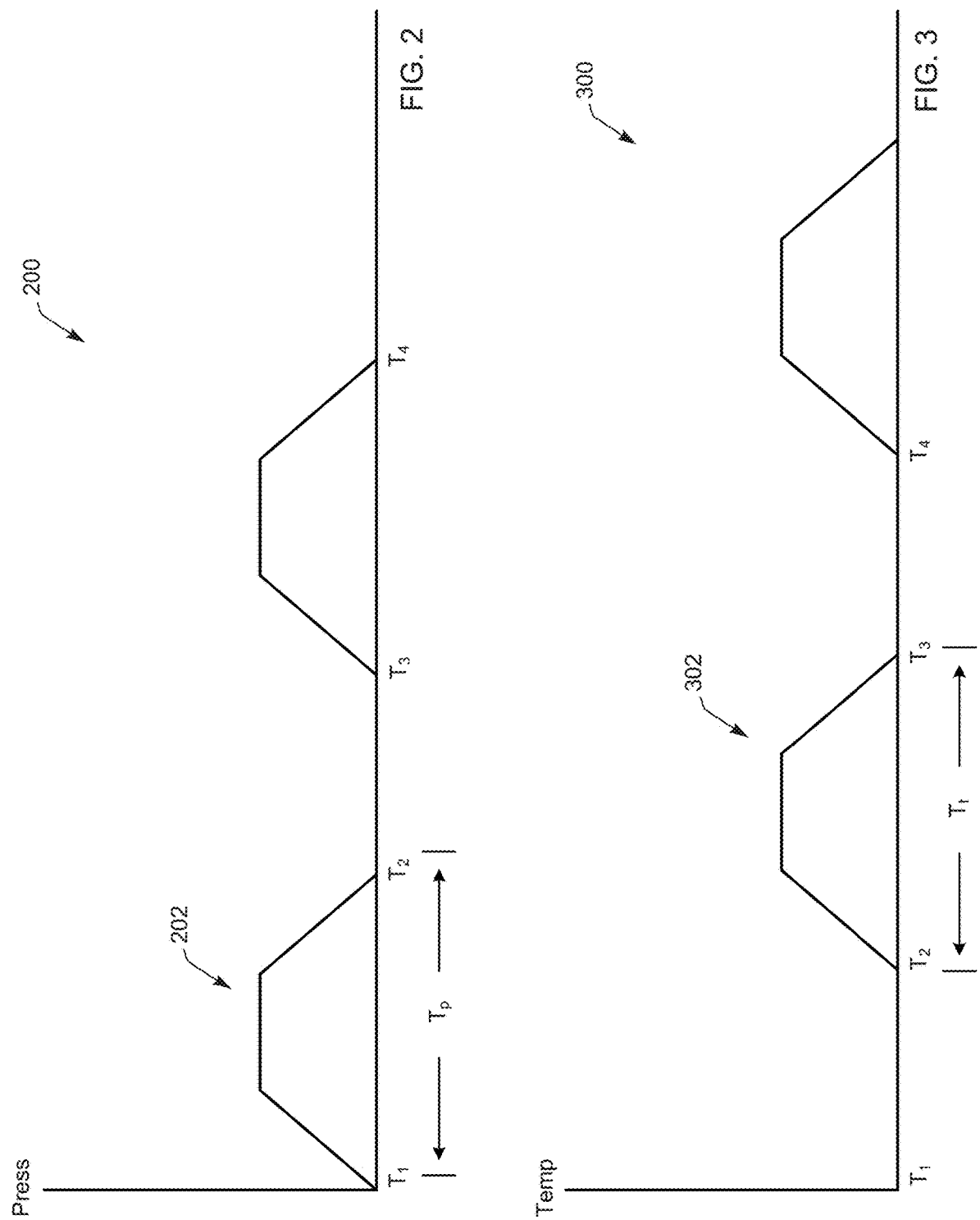

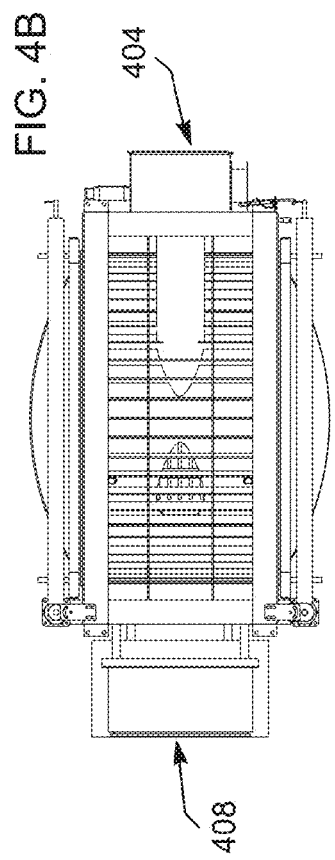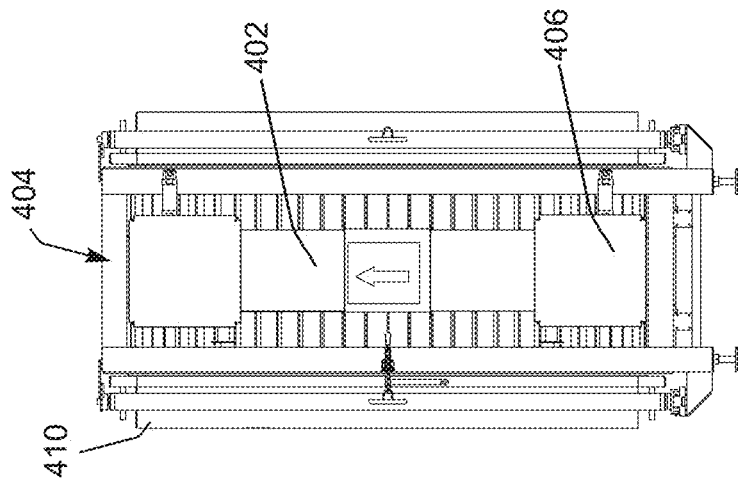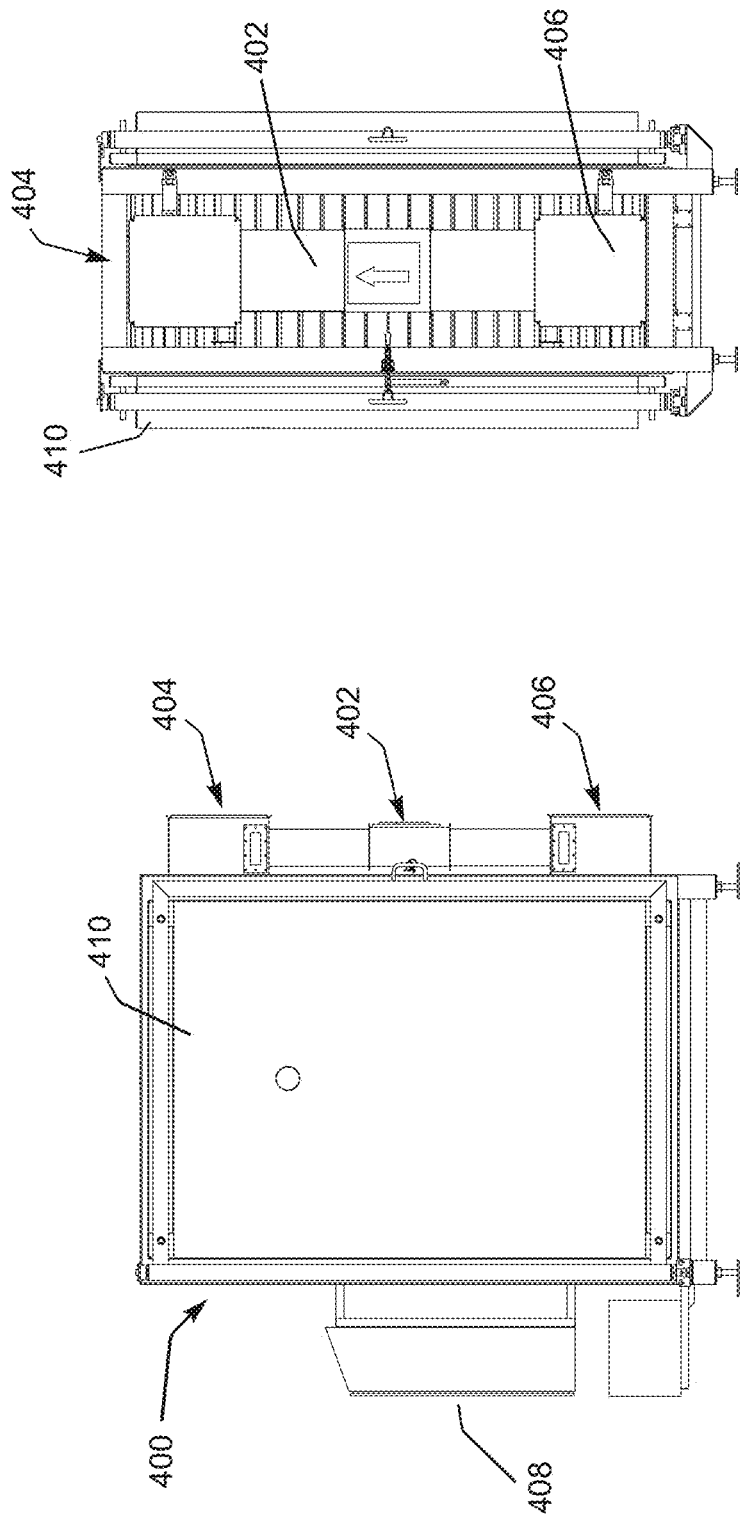

| WIP 26007 - 45% MSC | | | | |
|---|---|---|---|---|
| Lot 168 - 06/16/16 | | | | |
| | | | | |
| Total Time in Dry Rooms | | | | |
| 6/17/16 4:15 PM | Start | | 6/17/16 4:15 PM | DR 1 |
| 6/26/16 7:30 AM | Finish | | 6/18/16 4:00 PM | Test Dryer |
| 8.64 | Days to dry | | 0.99 | Total Time in DR 1 |
| | | | | |
| GW | 238 | | | |
| Tare | 217.61 | | Weight out of DR 1 | 412 |
| Total | 455.61 | | Net Weight | 194 |
| | | | Weight to lose | 40 |
| DW 65.00% Yield | 154.70 | | | |
| Tare | 217.61 | | 6/18/16 4:15 PM | DR 1 |
| Total | 372.31 | | 6/26/16 7:30 AM | Test Dryer |
| | | | 7.64 | Total Time in Vacuum DR |
| reset safey & hit blue button | | | | |
| zero scale | | | | |
| enter tare weight | | | | |
| enter green weight | | | | |
| start | | | | |
| | | | | |
| Tare | | Test Tare | | |
| 1 tree | 207 | 207.00 | | |
| 1 Rod | 2.6342 | 7.90 | | |
| 11 / casing/loop/clip | 0.9021 | 2.71 | | |
| | | 217.61 | | |
| | | | | |
| Rods | 3 | | | |

| | | | |
|---|---|---|---|
| WIP 26007 - 45% MSC | | | |
| Lot 146 - 05/25/16 | | | |
| | | | |
| Total Time in Dry Rooms | | | |
| 5/26/16 3:54 PM | Start | 5/26/16 3:54 PM | DR 10 |
| 6/4/16 4:00 PM | Finish | 5/29/16 11:00 AM | Test Dryer |
| 9.00 | Days to dry | 2.80 | Total Time in DR 9 |
| GW | 243 | | |
| Tare | 218 | Weight out of DR 9 | 412 |
| Total | 460.6089 | Net Weight | 194 |
| | | Weight to lose | 36 |
| DW 65.00% Yield | 157.95 | | |
| Tare | 217.6089 | 5/29/16 11:00 AM | DR 9 |
| Total | 375.5589 | 6/4/16 4:00 PM | Test Dryer |
| | | 6.21 | Total Time in Vacuum |
| reset safey & hit blue button | | | |
| zero scale | | | |
| enter tare weight | | | |
| enter green weight | | | |
| start | | | |
| | | | |
| Tare | | Test Tare | |
| 1 tree | 207 | 207 | |
| 1 Rod | 2.6342 | 7.9026 | |
| 11 / casing/loop/clip | 0.9021 | 2.7063 | |
| | | 218 | |
| | | | |
| Rods | 3 | | |
| | | | |
| Product Stuffed on 05/25/16 | | | |

FIG. 10

METHOD AND APPARATUS FOR DRYING FOOD ITEM

CROSS REFERENCE

This application claims the benefit of and priority to U.S. Provisional Patent Application Ser. No. 62/256,921 entitled METHOD AND APPARATUS FOR DRYING FOOD ITEM filed Nov. 18, 2015 and is hereby incorporated herein by reference in its entirety.

BACKGROUND

Field

This technology as disclosed herein relates generally to drying or dehydration of a food item and, more particularly, to manipulating pressure and heat to expedite the drying process of a food item.

Background

Drying or dehydrating food items is practiced in the food industry. For example, a number of processes have been utilized for preparing matured or cured meat products, especially sausage meat products. Sausage meat products can be preserved for longer or shorter time periods depending on their degree of curing. These processes can include preparing a ground mix of meat composed of one or more meat products for a sausage and stuffing the ground mix in a casing to form the sausage products. As part of the process, the ground mix can be allowed to ferment by hanging the sausage products in a fermentation chamber, which is maintained at a controlled temperature that depends on each type of sausage product, for a predetermined time that can vary from one day to several days. The sausage products can be smoked during or after the fermentation. The sausage products can be cooked and are typically hung and allowed to dry for a time period sufficient to achieve a predetermined moisture reduction in the product, and this drying period can be prolonged from ten days to several months for the most cured sausage products.

Given that drying is an important part of the process, the food industry has dedicated resources to develop a number of apparatuses and processes to reduce the time it takes to dry sausage products without negatively effecting the texture, quality or taste of the food item. Some processes have cut the sausage product into slices rather than curing a sausage stick to facilitate and expedite the curing process. One process can be the application of raised temperatures from various heat sources, such as for example a microwave heat source, while the product is under vacuum have been utilized to expedite the drying process. However, this process tends to result in non-uniform heating of a food item, particularly for larger food items such as for example a sausage stick. Non-uniform heating will result in certain portions of the food item being dryer than others. The non-uniform heating with microwave is further amplified when larger vacuum chambers are used. Also manipulation of pressure in a controlled environment has been utilized to expedite the drying process. Some of the processes have resulted in food item having less than desirable characteristics. For example, use of a microwave-vacuum process on a sausage stick can result in a discontinuity in the drying process because the heating is not uniform, therefore the desired moisture-protein ratio is not achieved. Also, many of the processes have not significantly expedited the drying time. It should be noted that although the term "cure" in the fermented sausage industry in general refers to removing moisture using salts, nitrates and sugars through osmosis, the term "cure" used herein throughout the summary, the detailed description, associated drawing and claims is specifically referring to the drying portion of the process. A process is needed that dries a food item, for example a sausage stick, faster and more efficiently and that results in a product that has desired characteristics.

SUMMARY

The technology as disclosed herein is a method and apparatus for curing a food item utilizing a vacuum environmental profile and a temperature environmental profile using convection heating. Convection is heat transfer by mass motion of a fluid such as air or water when the heated fluid is caused to move away from the source of heat, carrying energy with it and directed toward an item or volume to be heated.

One implementation of the technology as disclosed is an apparatus including a closed environmental control system having an internal sealable curing chamber. A vacuum pump is communicably connected to the internal sealable curing chamber and can be used to create a vacuum in the internal sealable curing chamber. One implementation of the housing for the curing chamber is a housing constructed of metal alloy or preformed concrete. The vacuum pump and internal sealable chamber is maintain the vacuum for a time sufficient for the food item temperature to drop to a predetermined level and to achieve a pre-determined moisture content for a selected food item. Application of a vacuum increases the rate of evaporation of water thereby reducing the time to dry. The higher the temperature needed to cure the faster the rate of evaporation. A vacuum can be applied, which can lower the temperature needed to cure a product such as for example, a food item can be exposed to (130-80 F in 2 hrs.). For example a 1.5 moisture-to-protein (M/P) ratio can be achieved in 7 days. The energy requirements for a vacuum of 76 HP for 42,600 pounds of product can be determined. Vacuum levels can range from 10 to 20 in hg. One implementation of the technology has vacuum level at about approximately 15 in hg, however, the drying process can be optimized by gradually increasing the vacuum levels based on measured weight loss until the maximum desired weight loss is met.

One implementation of the technology as disclosed includes a closed heat transfer system, which directs heated fluid into the internal sealable curing chamber by convection through an inlet port in fluid communication with the internal sealable curing chamber and where the closed heat transfer system pulls spent fluid from the internal sealable curing chamber through an outlet port thereby elevating a temperature within the curing chamber and thereby elevating the temperature of the food item. The heat transfer system has a controller for cycling on and off the heat transfer. After the heat cycle, the convection heating will cycle off and the vacuum can be reapplied as needed. Reheating the food item by way of a heating cycle and then reapplying the vacuum can be effective because the hotter the product and the higher the vacuum, the quicker the food item will dry. The vacuum created can be maintained at a level whereby a drying time for achieving the predetermined moisture content does not exceed 200 hours. This apparatus when used properly can reduce the curing time by approximately half.

The system can be programmed to implement various cycles of a vacuum for a predetermined duration and at predetermined levels. Also with the implementation of the technology as disclosed, there is also an ability to ferment, cook and dry in the same vessel.

Another implementation of the technology as disclosed has a scale operatively attached to a support structure for the food item for measuring a weight of the food item and the scale has a weight signal transmitter transmitting a weight signal representative of the weight of the food item. For example, a tension scale is attached between a fixed support structure and a hanging support structure for the food item. In yet another implementation a temperature sensor is be operatively positioned for detecting a food item's temperature and the sensor can have a temperature signal transmitter transmitting a temperature signal representative of the temperature of the food item. A controller is used for adjusting the temperature within the curing chamber based upon and responsive to receiving the weight signal for the food item and the temperature signal food item.

One implementation of the technology as disclosed is a method for curing a food item that includes placing a food item in a curing chamber that is sufficiently sealable to create a vacuum in the sufficiently sealed curing chamber. The method can further include sealing the curing chamber and creating a vacuum in the curing chamber with a vacuum pump, and maintaining the vacuum thereby exposing the food item to the vacuum for a time sufficient to achieve a predetermined moisture content. One implementation of the method includes elevating a temperature within the curing chamber by transferring heat into the curing chamber using convection to thereby raise the temperature of the food item for a predetermined reheat cycle without exposing the food item to the vacuum. One implementation of the technology includes measuring a weight of the food item, detecting a food item temperature and adjusting the temperature within the curing chamber based upon and responsive to the weight of the food item and the food item temperature. Changes in the weight of a food item can be a result of a reduction of moisture content.

The method for curing of a food item can include implementing an environmental profile. Implementation of the profile can be controlled by software of a computing system or controller and the software can control data collection and data recording by controlling electronic input and electronic storage devices. Trigger points can be programmed to reheat or the heat level or the heat duration and trigger points can be programmed to change vacuum level and duration for which vacuum is maintained.

The features, functions, and advantages that have been discussed can be achieved independently in various implementations or may be combined in yet other implementations further details of which can be seen with reference to the following description and drawings. These and other advantageous features of the present technology as disclosed will be in part apparent and in part pointed out herein below.

BRIEF DESCRIPTION OF THE DRAWINGS

For a better understanding of the present technology as disclosed, reference may be made to the accompanying drawings in which:

FIG. 2 is a vacuum environmental profile over time;

FIG. 3 is temperature environmental profile over time;

FIG. 4A, 4B, 4C, 4D are an illustration of a vacuum dryer apparatus;

FIG. 7 is an illustration providing parameters from a dehydration run;

FIG. 8 is an illustration providing parameters from a dehydration run;

FIG. 9 is an illustration of a pepperoni drying curve under vacuum; and

FIG. 10 is an illustration providing parameters from a dehydration run.

Figure 1:
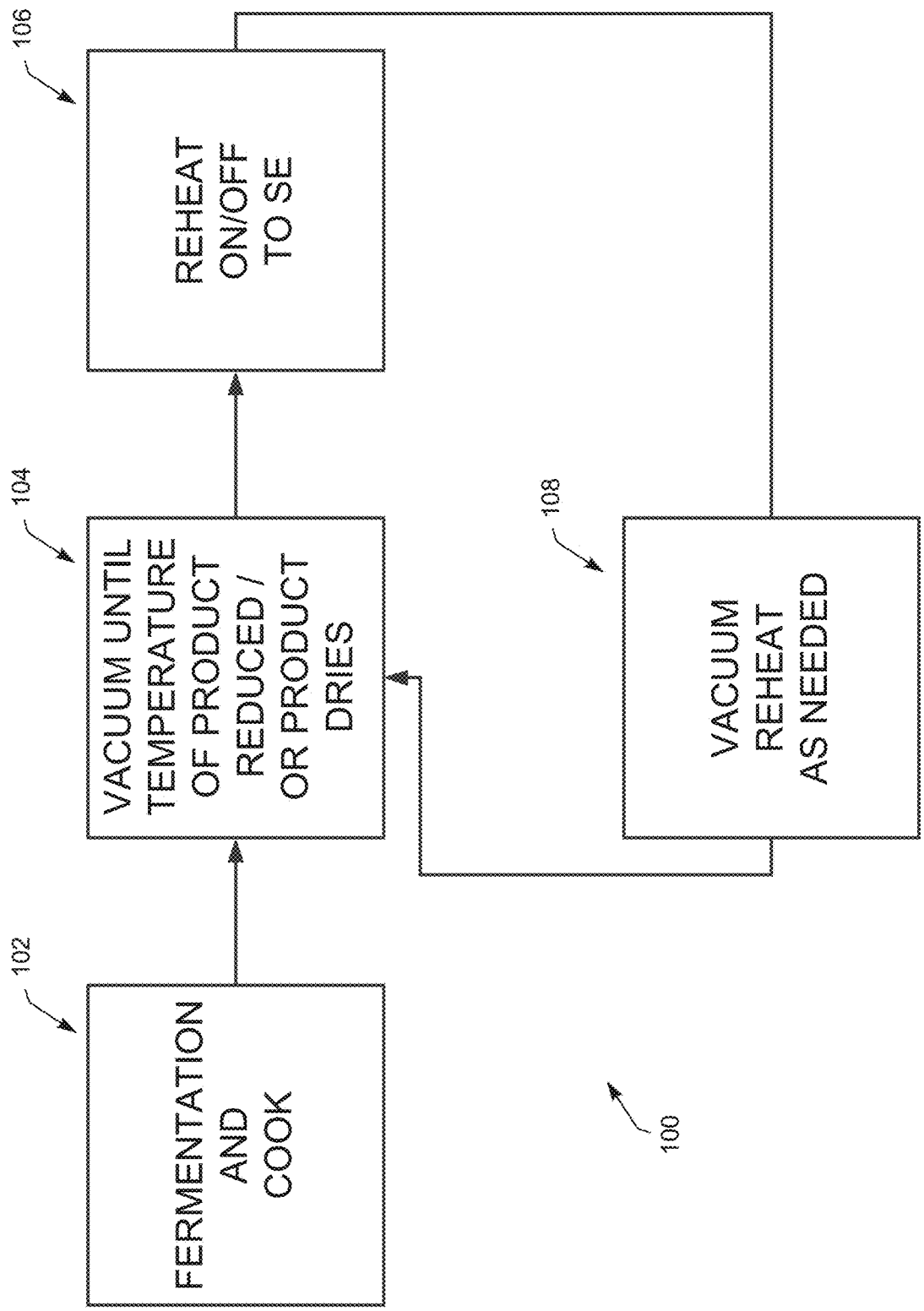
FIG. 1 is an illustration of a process flow for drying a food item.

While the technology as disclosed is susceptible to various modifications and alternative forms, specific implementations thereof are shown by way of example in the drawings and will herein be described in detail. It should be understood, however, that the drawings and detailed description presented herein are not intended to limit the disclosure to the particular implementations as disclosed, but on the contrary, the intention is to cover all modifications, equivalents, and alternatives falling within the scope of the present technology as disclosed and as defined by the appended claims.

DESCRIPTION

According to the implementation(s) of the present technology as disclosed, various views are illustrated in FIG. 1-10 and like reference numerals are being used consistently throughout to refer to like and corresponding parts of the technology for all of the various views and figures of the drawing. Also, please note that the first digit(s) of the reference number for a given item or part of the technology should correspond to the Fig. number in which the item or part is first identified.

Figure 1A:
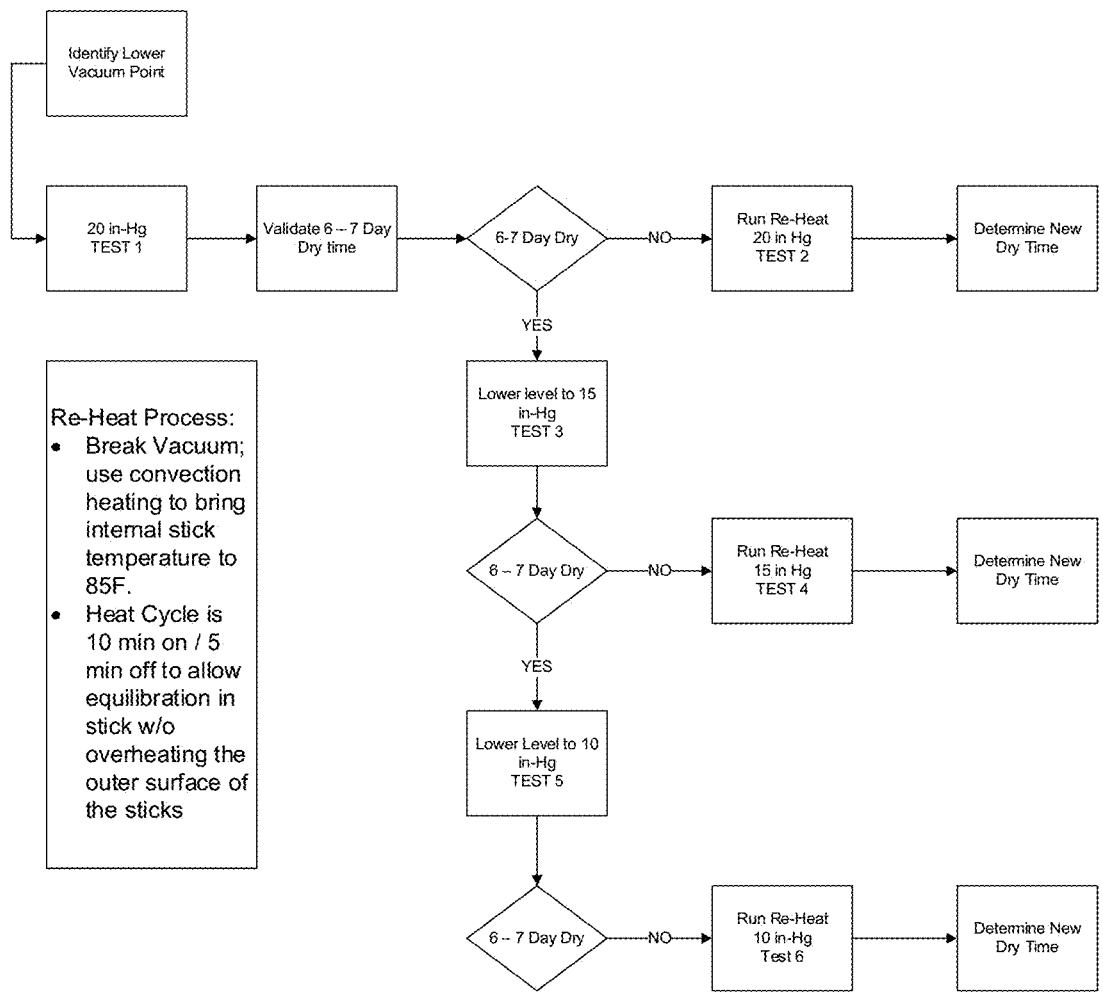
FIG. 1A is an illustration of a test protocol.
Figure 4D:
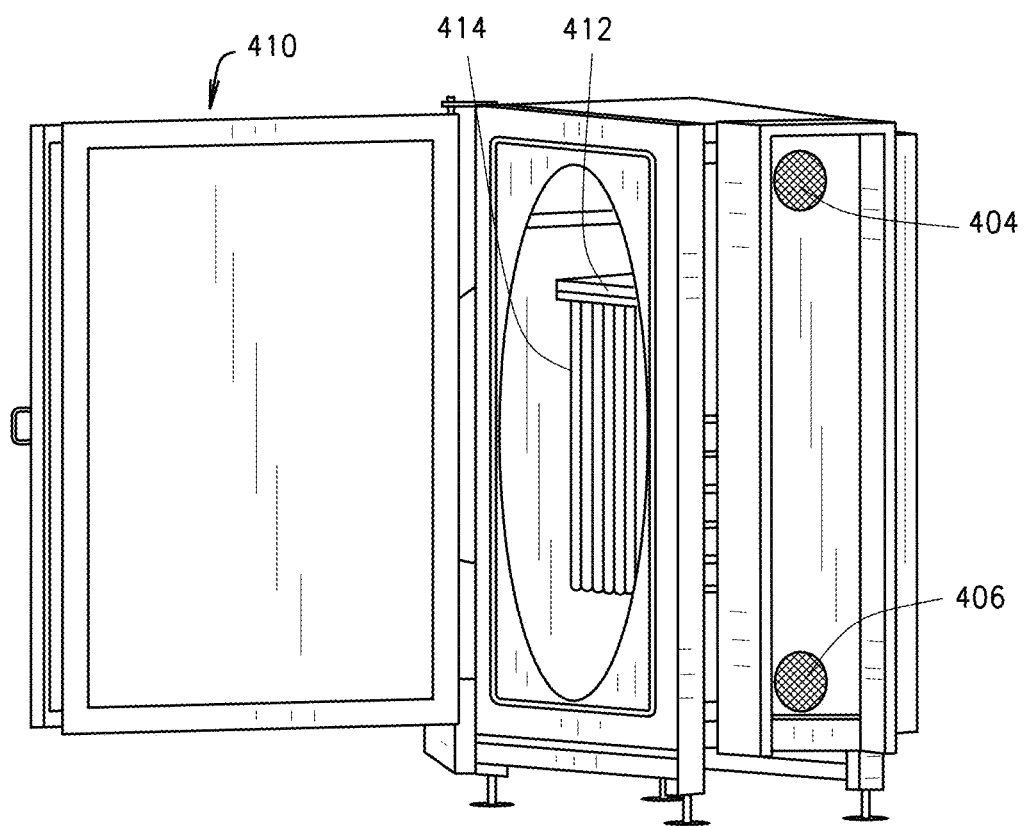

One implementation of the present technology as disclosed including a method and apparatus for curing a food item utilizing a vacuum environmental profile and a temperature environmental profile using convection heating teaches a technology for more efficiently curing a food item such as for example pepperoni sticks or other sausage stick items The details of the technology as disclosed and various implementations can be better understood by referring to the figures of the drawing. Referring to FIG. 1, an illustration of a process flow for drying a food item is provided. As outlined, the environmental system having an internal sealable curing chamber can be utilized for fermentation and cooking in addition to the vacuum and reheat process. Therefore, the process can begin with fermentation and cooking 102 of a food item. A vacuum can be introduced in the internal sealable curing chamber for a pre-determined time or until the food item's temperature has been reduced to a pre-determined temperature level 104. The vacuum can be eliminated and a reheat on/off cycle 106 can be initiated. The reheat cycle will raise the temperature of the food item and the vacuum/reheat sequence 108 can be repeated as needed. FIG. 1A is an illustration of a type of test protocol that can be utilized to determine the optimal values for the drying profiles.

The following controls reference for developing a Research & Development tool designed to develop and evaluate the benefits of holding commercially manufactured pepperoni sticks in a strictly controlled environment where atmospheric pressures and pepperoni stick temperatures are manipulated to provide a superior product. The following control reference in no way narrows the scope of the technology as disclosed and claimed herein and is intended as reference.

Control Specifications:
The controls provided for this equipment shall capable of housing up to 6 independent recipes;
  Process Parameters in the recipes include but may not be limited to
    Vacuum Level
    Product Temperature
    Environment temperature
    Product weight
    Time in Process
  Vacuum Levels
    Maximum (based on altitude) 28 in-Hg
    Minimum Atmospheric at location
  Product temperature Range (4 Probes)
    Maximum 140 F
    Minimum 40 F
  Relative Humidity
    Maximum 100%
    Minimum 0%
  Environmental Temperature 2 probes (Chamber temperature)
    Maximum 145 F
    Minimum 40 F
  Product weight
    Maximum 1200 lbs.
    Minimum 200 lbs.
  Time in process (w/time stamp)
    Maximum 400 Hours
    Step process changes may be hourly
Communication
  Remote manipulation of recipes is required
  Remote monitoring of ongoing process is required
  The process may only be started locally
Data
  Data history for entire process shall be downloadable and available remotely as well as locally
  Data from process can be exported to MS excel
Alarming (Time Stamp)
  Vacuum out of Range
  Product Temp out of range
  Environment out of range
  Product weigh out of range
Calculations displayed and recorded
  Yield based on percent from initial weight
Skid Parameters
Door Systems:
  A single door manually opened and closed or with pneumatic assist
  Door seals capable of sustaining vacuum parameters mentioned previously
  One viewing window no less than 12" square or 12" Diameter
  Manual latches to hold door in place during vacuum cycling
Box (Vacuum Chamber)
  Floor Pitch ⅛" in 12" of distance
    Design should be self-draining
  Structural members shall be SS angle (No tubing)
  Wall Construction 316 SS
  Skid should be fitted with an appropriate leveling system
  Vacuum port at top of box: Locate in mid-point and at the rear of the skid
  Hot air ducting on each side of the box fed by a single heat source; this is to be a closed system
    Heat source shell be a resistance heating element
      kW to be determined
    Return ducting from the top center of the box.
    Variable speed control on circulation fan
    Fan Type to be determined based on static pressure analysis of ducting system.
  Vacuum Pump is to be a liquid ring type construction
    HP to be determined
Air Filtration and regulation for pneumatic systems to be included
  Safety Considerations
  Automatic 4" vent valve
    Activated from pull cord around perimeter of interior of box; not the door
  Manual vent valves (ball) located on interior of box on all interior surfaces located 2' from floor level
  Clearly marked Manual vent valve (ball)
  Clearly Marked Confined Space Permit access labeling in accordance with all federal and state local policies.
  E-Stop Pull chords on interior as specified.
    Should open automatic vent
    Stop vacuum pump
    Audible and Visual alarming that safety has been activated
  Local Password followed by local start command; system may not be activated remotely; but may be stopped remotely
Recipe Programing
  Step style (Up to 15 steps) processing parameters based on the time in process function with associated dependent parameter target.

Example 1

Step X
Vacuum=Atmospheric
Heat on
Max Time=1 hr (product safety)
Max product Temp 130
Move to next step.

Referring to FIG. 2, a vacuum environmental profile 200 over time is provided. The vacuum on/off cycle 202 can have a pre-determined duration $T_p$ and/or the duration $T_p$ can be controlled by the temperature of a food item. A vacuum on/off cycle can be repeated as shown between times $T_3$ and $T_4$.

Referring to FIG. 3, a temperature environmental profile over time 300 is provided. The temperature on/off cycle 302 can have a pre-determined duration $T_t$ and/or the duration $T_t$ can be controlled by the temperature of a food item. A temperature on/off cycle can be repeated as shown between times $T_4$ and $T_5$.

Referring to FIGS. 4A, 4B, 4C and 4D illustrations of an environmental control system 400 are provided. The environmental control system 400 can include an internal sealable curing chamber 401. A pneumatically assisted door 410 can be selectively opened to place food items 414 in the internal sealable curing chamber and selectively closed and to seal the food items therein and initiate the environmental profile. The food items 414 can be hung from a curing rack 412 for hanging a sausage stick. As illustrated, the food item can be a sausage stick. The vacuum environmental profile can be initiated once the door 410 is sealed. The vacuum can be released and the temperature environmental profile can be initiated. A closed heat transfer system can include a convection heat source 402, a convection inlet 404 and a convection outlet 406. A vacuum pump 408 can be utilized to create a vacuum within the internal sealable curing chamber. By creating a vacuum, the internal sealable curing chamber can be utilized as a vacuum driver. The directing heated fluid can flow in either direction whether from the outlet 406 to the inlet 404 or in the opposite direction. The drying time to achieve the desired moisture-to-protein ratio can be determined. There is a desired moisture content for many food items such as pepperoni. The desired moisture content can vary depending on the type of product and the products formulation of different contents. However, generally for a predominantly red meat formulation, the moisture content is 69%, whereas generally for a predominantly poultry formulation, the moisture content can be 65%. The curing rack can be instrumented with weight sensors configured to transmit the weight of the food items hanging on the rack. The vacuum on/off cycle and the temperature on/off cycle can be based upon a pre-determined and desired moisture content, and/or a predetermined weight of a food item. The food items can have temperature sensors to sense the temperature of food items. Please see FIGS. 7, 8, 9 and 10, which provide some drying run summaries and a drying curve graph for a run under 15 in-hg.

By way of example, the vacuum can be created at a level whereby a drying time for achieving the predetermined moisture content does not exceed 200 hours. The curing procedure can include measuring a weight of the food item and detecting a food item's temperature. The temperature within the curing chamber can be adjusted based upon and responsive to the measured weight of the food item and the food item temperature. Elevating the temperature within the curing chamber can be such that the food item temperature doesn't exceed 130 degrees Fahrenheit. Transferring heat into the curing chamber can be for no more than a 1 hour continuous interval. The procedure can be implemented such that maintaining the vacuum and elevating the temperature does not exceed a duration, whereby the weight of the food item drops below a predetermined weight. The sausage stick can be a fermented meat sausage stick where the meat sausage includes one or more of beef, pork and poultry meat sausage. The procedure can implement an environmental profile where maintaining the vacuum is for a duration of 7 days at a pressure of 28.5 in-Hg then reheating the food item to not exceed a temperature of 130 degrees Fahrenheit. If the pressure is reduced below 15 in-Hg, the duration may be extended. It is noted that lower vacuums will tend to result in a more uniform humidity.

Figure 5:
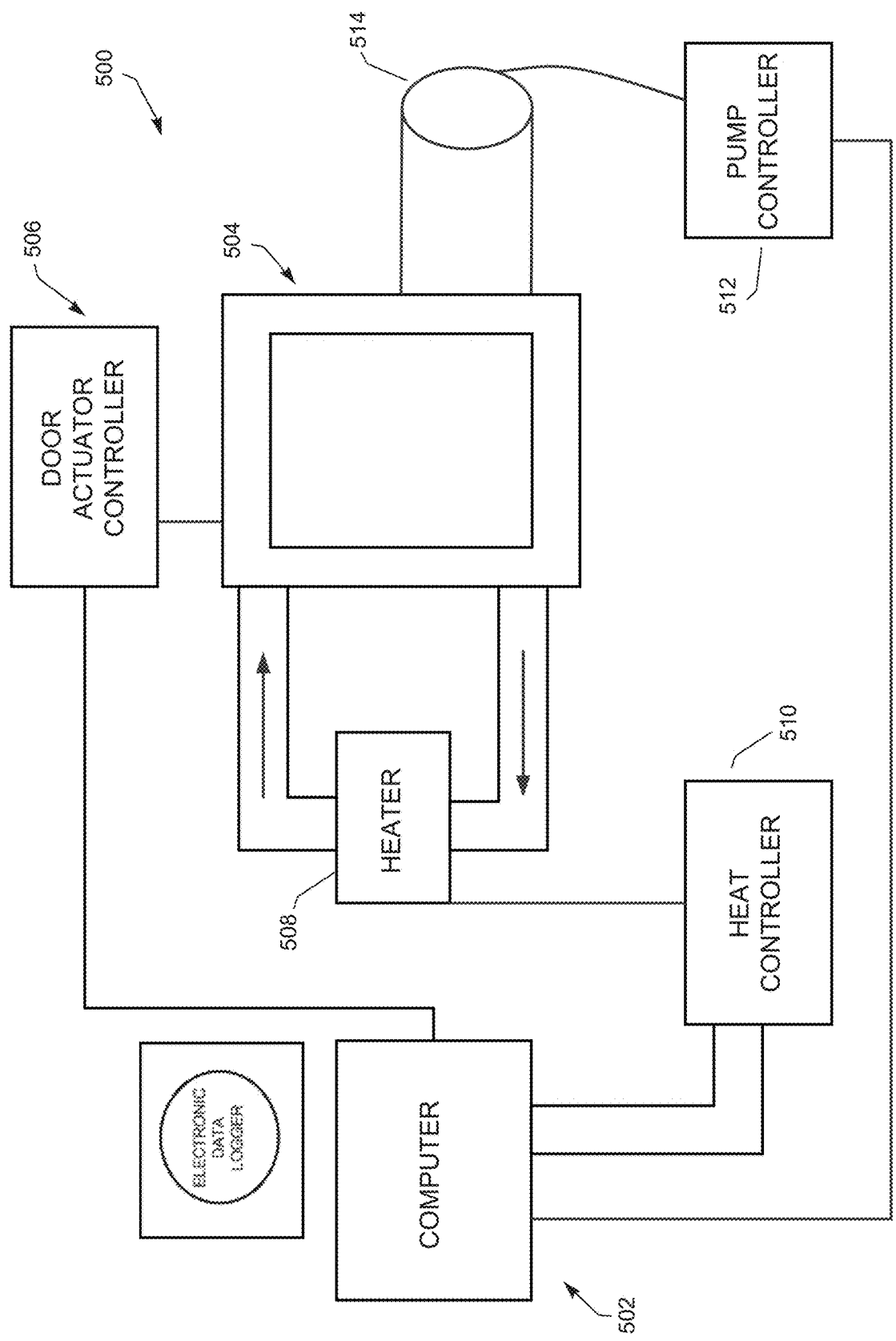
FIG. 5 is an illustration of a computer network environment over which the environmental control system communicates.

Referring to FIG. 5, an illustration of a computer network environment 500 over which the environmental control system communicates is provided. The environmental control system 504 can be controlled by a computer and user interface system 502. The computer system can be used to control a door actuator controller 506 to selectively open and selectively close and seal the door to the internal sealable curing chamber. The computer system can also be used by a user to program and control a pump controller 512 to control a pump 514 to initiate a vacuum cycle. The computer system can further be used by a user to program and control a heat controller 510 that controls a convection heater 508 to initiate the preheat on/off cycle.

Figure 6:
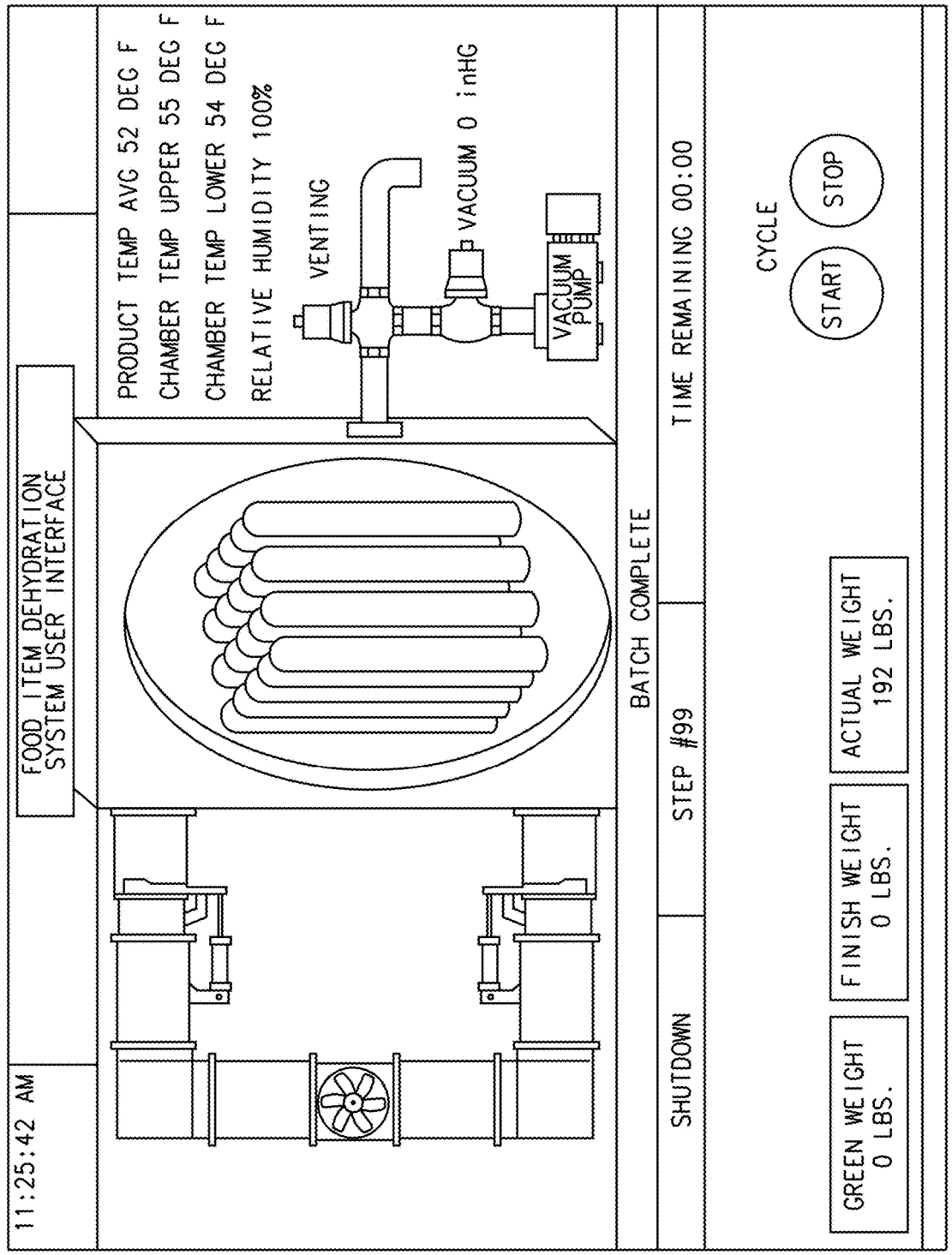
FIG. 6 is an illustration of a computer implemented user interface.

Referring to FIG. 6 an illustration of a computer implemented user interface is provided for the environmental control system for food item dehydration. The user interface can display various parameters to a user relating to the food item and the environmental chamber conditions including various food item weight parameters and chamber temperature and humidity parameters. The user interface can provide various parameters relating to the batch run as well as the operational status of the heating system and the pump. The user interface can provide time and date information and provide information relating to whether the door is sealed and whether a food item is currently inserted in the chamber or not. The user interface can be a touch-screen interface and can also be used to program and control the vacuum and temperature cycles. The user interface can allow a user to start and stop temperature and pressure cycles and provide information on various parameters.

Referring to FIG. 7, a table is provided illustrative of parameters from a 45% MSC blend test run. The total days to dry is 8.64 days. The "Green Weight" (GW), pre-processed product weight, is 238. The "Tare Weight" (Tare), the weight of the tree, rod and casing, un-laden without the product, is 217.61, for a total weight of the product and Tare weight at 455.61. The dehydrated weight of the product with a 65% yield is a 154.7. The total time at temperature without vacuum was about 0.99 days, resulting in a net weight of the product at approximately 194 with a remaining 40 to lose to reach the 65% yield. The total time under vacuum was about 7.64 days for a total drying time of approximately 8.64 days.

Figures 8, 9:
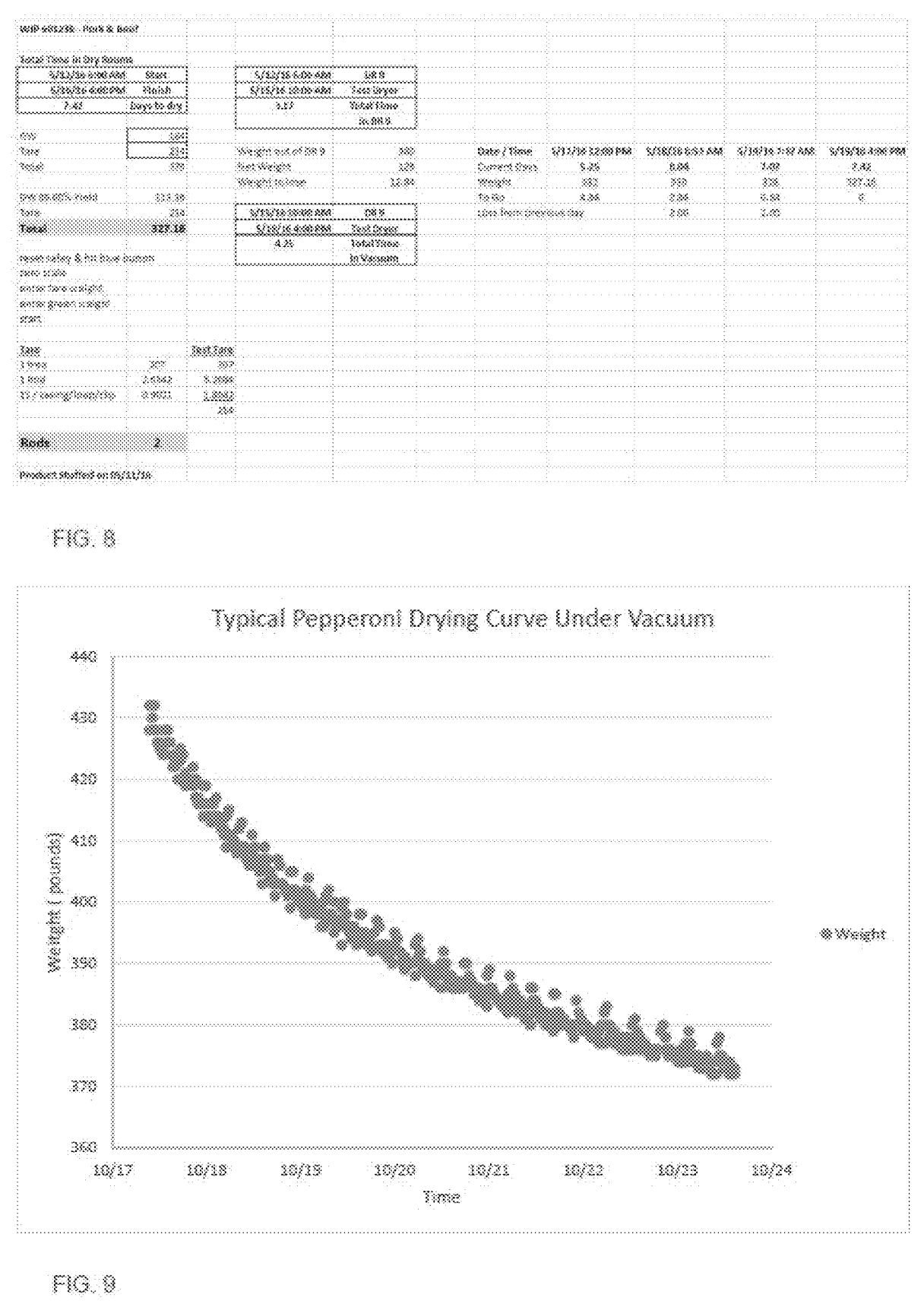

Referring to FIG. 8, a table is provided illustrative of parameters from a predominate pork-beef blend test run. The total days to dry is 7.42 days. The "Green Weight" (GW), pre-processed product weight, is 164. The "Tare Weight" (Tare), the weight of the tree, rod and casing, un-laden without the product, is 214, for a total weight of the product and Tare weight at 378. The dehydrated weight of the product with a 69% yield is at 113.16. The total time at temperature without vacuum was about 3.17 days, resulting in a net weight of the product at approximately 126 with a remaining 12.84 to lose to reach the 69% yield. The total time under vacuum was about 4.25 days for a total drying time of approximately 7.42 days.

Referring to FIG. 9, the graph provided illustrates a pepperoni drying curve when under vacuum. The weight of the product in pounds is graphed over time. Referring to FIG. 10, a table is provided illustrative of parameters from a 45% MSC blend test run. The total days to dry is 9.0 days. The "Green Weight" (GW), pre-processed product weight, is 243. The "Tare Weight" (Tare), the weight of the tree, rod and casing, un-laden without the product, is 218, for a total weight of the product and Tare weight at 460.61. The dehydrated weight of the product with a 65% yield is at 157.95. The total time at temperature without vacuum was about 2.8 days, resulting in a net weight of the product at approximately 194 with a remaining 12.84 to lose to reach the 65% yield. The total time under vacuum was about 6.21 days for a total drying time of approximately 9.0 days.

The attached parameter reflecting test drying runs reflect illustrates that the system and method as disclosed can reduce the drying time from what can typically be at least 12 drying days. The test protocol was designed to find the lowest vacuum levels without significantly increasing the drying time past 6.5/7 days. Once this product limit is found, a re-heat step can be added to the process in order to further speed up the drying process. The vacuum levels will be dropped by 5 in-Hg for each test until the lower limit is found.

Certain systems, apparatus, applications or processes are described herein as including a number of modules. A module may be a unit of distinct functionality that may be presented in software, hardware, or combinations thereof. When the functionality of a module is performed in any part through software, the module includes a computer-readable medium. The modules may be regarded as being communicatively coupled. The inventive subject matter may be represented in a variety of different implementations of which there are many possible permutations.

The methods described herein do not have to be executed in the order described, or in any particular order. Moreover, various activities described with respect to the methods identified herein can be executed in serial or parallel fashion. In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

In an example implementation, the machine operates as a standalone device or may be connected (e.g., networked) to other machines. For example, the environmental system including a curing chamber can be designed such that the vacuum system and the temperature control system is controlled by a computing device that communicates on a network. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine or computing device. Further, while only a single machine is illustrated, the term "machine" shall also be taken to include any collection of machines that individually or jointly execute a set (or multiple sets) of instructions to perform any one or more of the methodologies discussed herein.

The computer system and client computers can include a processor (e.g., a central processing unit (CPU) a graphics processing unit (GPU) or both), a main memory and a static memory, which communicate with each other via a bus. The computer system may further include a video/graphical display unit (e.g., a liquid crystal display (LCD) or a cathode ray tube (CRT)). The computer system and client computing devices can also include an alphanumeric input device (e.g., a keyboard), a cursor control device (e.g., a mouse), a drive unit, a signal generation device (e.g., a speaker) and a network interface device.

The drive unit includes a computer-readable medium on which is stored one or more sets of instructions (e.g., software) embodying any one or more of the methodologies or systems described herein. The software may also reside, completely or at least partially, within the main memory and/or within the processor during execution thereof by the computer system, the main memory and the processor also constituting computer-readable media. The software may further be transmitted or received over a network via the network interface device.

The term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present implementation. The term "computer-readable medium" shall accordingly be taken to include, but not be limited to, solid-state memories, and optical media, and magnetic media.

The computer system may also provide a graphical user interface that displays to a user the environmental profile information including current vacuum level, chamber temperature and food item temperature.

The various implementation of the technology as disclosed and shown above illustrate an efficient method and apparatus for curing a food item. A user of the present technology as disclosed may choose any of the above implementation, or an equivalent thereof, depending upon the desired application. In this regard, it is recognized that various forms of the subject technology as disclosed could be utilized without departing from the scope of the present invention.

As is evident from the foregoing description, certain aspects of the present technology as disclosed are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the scope of the present technology as disclosed and claimed.

Other aspects, objects and advantages of the present technology as disclosed can be obtained from a study of the drawings, the disclosure and the appended claims.

What is claimed is:

1. The apparatus for curing a food item comprising:
a closed environmental control system having an internal sealable curing chamber;
a vacuum pump communicably connected to the internal sealable curing chamber and configured for creating a vacuum in the internal sealable curing chamber, and said vacuum pump is controllable to maintain the vacuum for a time sufficient to achieve a predetermined moisture content for a selected food item;
a closed heat transfer system configured to direct heated fluid into the internal sealable curing chamber by convection through an inlet port in fluid communication with the internal sealable curing chamber and where the closed heat transfer system is configured to pull spent fluid from the internal sealable curing chamber through an outlet port thereby elevating a temperature within the curing chamber concurrently with the vacuum;
a scale operatively attached to a support structure for the food item for measuring a weight of the food item and having a weight signal transmitter transmitting a weight signal representative of the weight of the food item;
a temperature sensor operatively positioned for detecting a food item temperature and having a temperature signal transmitter transmitting a temperature signal representative of the temperature of the food item; and
a controller configured to control the closed heat transfer system and the vacuum pump for adjusting the temperature within the curing chamber based upon and responsive to receiving the weight signal for the food item and the temperature signal food item.

2. The apparatus for curing a food item as recited in claim 1, where the controller adjusts the temperature by adjusting vent valves controlling fluid flow through the inlet port and outlet port.

3. The apparatus for curing a food item as recited in claim 1, where the support structure is a rack for hanging sausage sticks.

4. The apparatus for curing a food item as recited in claim 1, where the controller is configured to control the vacuum pump to maintain the vacuum for a duration required to achieve a predetermined moisture-to-protein ratio.

5. The apparatus for curing a food item as recited in claim 1, where the internal sealable curing chamber has a pneumatically assisted door configured to open for access to the curing chamber and to sealable close the curing chamber.

6. The apparatus for curing a food item as recited in claim 1, where the controller outputs the weight signal and the temperature signal to a computer system configured to generate a user interface graphically displaying the weight and the temperature of the food item.

7. The apparatus for curing a food item as recited in claim 6, where the computer system provides on the user interface a starting weight of the food item and a current weight of the food item.

8. The apparatus for curing a food item as recited in claim 1, where the control system is programmed to adjust the vacuum and temperature for implementing an environmental profile maintaining the vacuum is for a duration of 7 days at a pressure of 28.5 in-Hg then reheating the food item to not exceed a temperature of 130 degrees Fahrenheit.

\* \* \* \* \*